(12) United States Patent
Softky

(10) Patent No.: US 8,719,273 B2
(45) Date of Patent: May 6, 2014

(54) ANALYTICS DATA INDEXING SYSTEM AND METHODS

(75) Inventor: William R. Softky, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 114 days.

(21) Appl. No.: 13/219,462

(22) Filed: Aug. 26, 2011

(65) Prior Publication Data
US 2014/0052732 A1 Feb. 20, 2014

(51) Int. Cl.
*G06F 7/00* (2006.01)
*G06F 17/30* (2006.01)

(52) U.S. Cl.
USPC .......................... 707/741; 707/662; 707/746

(58) Field of Classification Search
None
See application file for complete search history.

(56) References Cited

U.S. PATENT DOCUMENTS

| | | | |
|---|---|---|---|
| 6,266,657 B1 * | 7/2001 | deVries et al. ................. | 707/741 |
| 7,814,139 B2 * | 10/2010 | Singh et al. ................... | 709/201 |
| 7,885,942 B2 * | 2/2011 | Chand et al. .................. | 707/688 |
| 7,890,451 B2 * | 2/2011 | Cancel et al. ................. | 707/607 |
| 8,150,723 B2 * | 4/2012 | Chen et al. .................... | 705/7.29 |
| 8,214,337 B2 * | 7/2012 | Love et al. .................... | 707/662 |
| 2002/0143933 A1 * | 10/2002 | Hind et al. .................... | 709/224 |
| 2003/0004777 A1 * | 1/2003 | Phillips .......................... | 705/10 |
| 2010/0146144 A1 * | 6/2010 | Audenaert et al. ............ | 709/235 |
| 2010/0332513 A1 * | 12/2010 | Azar et al. ..................... | 707/769 |
| 2012/0089605 A1 * | 4/2012 | Bangalore et al. ............ | 707/737 |
| 2012/0109710 A1 * | 5/2012 | Rahman et al. ............... | 705/7.31 |

OTHER PUBLICATIONS

Wikipedia, "Exponential Decay," downloaded on Mar. 31, 2011, 6 pages.

* cited by examiner

*Primary Examiner* — Robert Beausoliel, Jr.
*Assistant Examiner* — Susan F Rayyan
(74) *Attorney, Agent, or Firm* — Kilpatrick Townsend & Stockton LLP

(57) ABSTRACT

Provided is a method that includes a method for updating index data. The method includes receiving index data, including an index value indicative of user activity on a network site and an index time corresponding to a time used for calculating the index value, receiving an update index time corresponding to a time used for updating the index data, determining an updated index value using an exponential decay of the index value from the index time to the update index time, wherein the updated index value comprises a decayed value of the index value corresponding to the update time, and storing updated index data including the updated index value and the update index time.

18 Claims, 7 Drawing Sheets

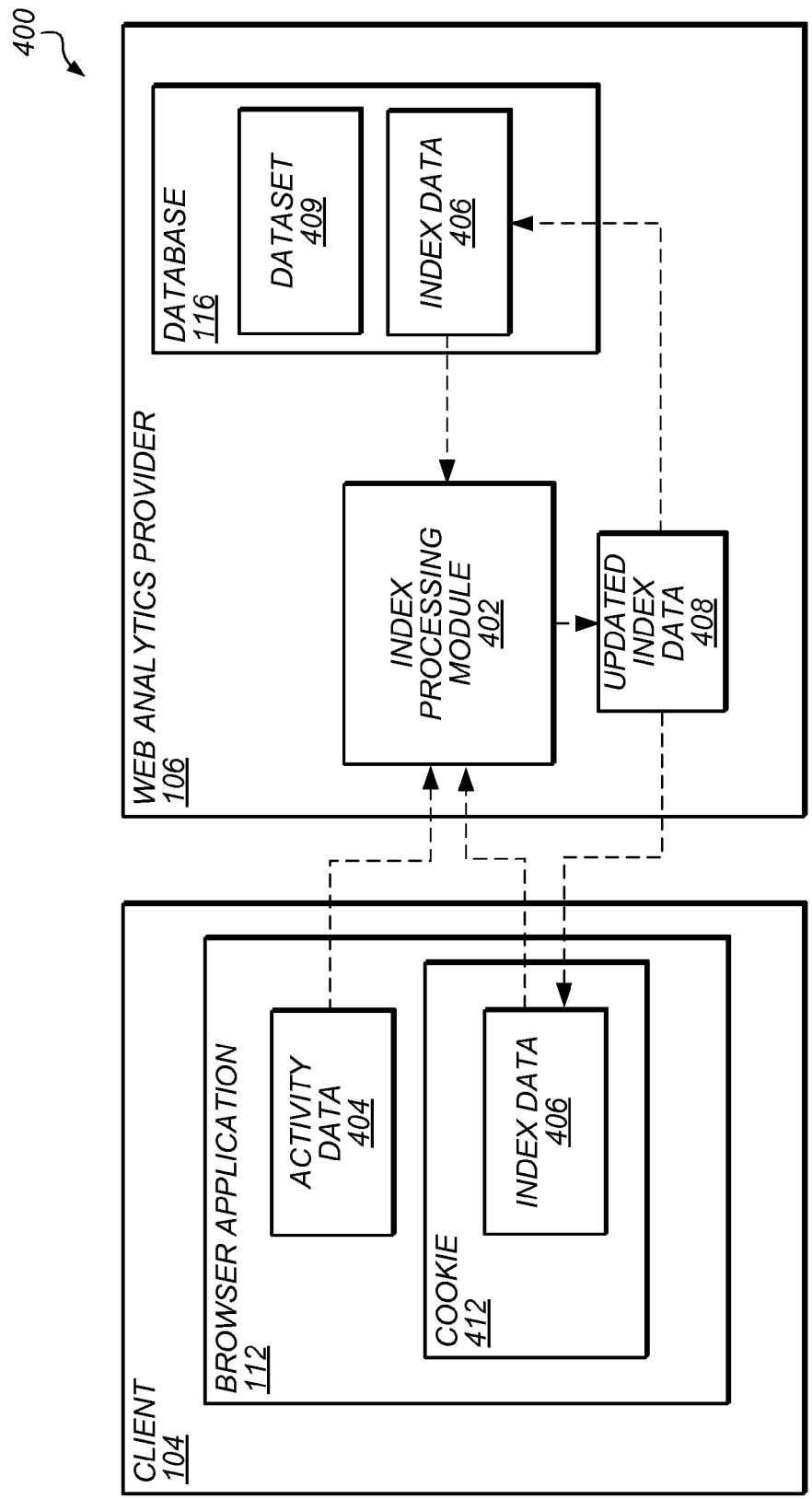

ANALYTICS DATA INDEXING SYSTEM AND METHODS

BACKGROUND

Website providers often desire to collect data that describes usage and visitation patterns for their websites. For example, website providers may collect information about how a visitor navigates through their website. This data is often referred to as web analytics data. Such information can be extremely valuable in developing usage statistics for various purposes, including for example estimating server load, determining advertising rates, identifying areas of websites that are in need of redesign, providing targeted advertising, and the like.

Web analytics data is often collected via logfile analysis or page tagging. Logfile analysis includes reading logfiles that store a web server's transactions. Page tagging uses executable code (e.g., a "web-bug") embedded in the webpage to transmit information about the user and their website visit when the webpage is executed by the visitor's browser application. The web analytics data is often gathered and stored at a web analytics provider to generate a database of web analytics data. The web analytics data may be processed to generate various web-analytics reports that can be used by a website administrator to assess and optimize their website. For example, a website provider may submit a query to a web analytics provider for a metric identifying what percentage of visitors are making purchases on the website, and the web analytics provider may process the stored data to provide the corresponding metric.

Over time, the amount of web analytics data collect can grow in size. For example, as the activity of the website and users increases, the amount of web-analytics data can increase dramatically. Thus, the web analytics data may have to be stored in a large database where it can be accessed for processing. Moreover, as the amount of analytics data grows larger, an increased amount of processing may be required to extract desired information from the analytics data. As a result, a web-analytics system may become complex, requiring a large amount of storage space to store the large amounts of web-analytics data and may require an increasing amount of processing to extract desired information from the web-analytics data. Further, some data may lose relevance over a period of time, decreasing its value to the web-analytics reports while still contributing to the complexities of storage and processing.

Accordingly, it is desirable to provide technique for efficiently managing (e.g., receiving, storing and processing) analytics data, such as web analytics data.

SUMMARY

Various embodiments of methods and apparatus for managing analytics data are described. In some embodiments, provided is a method for updating index data. The method includes receiving index data including an index value indicative of user activity on a network site and an index time corresponding to a time used for calculating the index value, receiving an update index time corresponding to a time used for updating the index data, determining an updated index value using an exponential decay of the index value from the index time to the update index time, where the updated index value comprises a decayed value of the index value corresponding to the update time, and storing updated index data including the updated index value and the update index time.

In some embodiments, provided is a non-transitory computer readable storage medium storing computer-executable program instructions that when executed by a computer cause receiving index data including an index value indicative of user activity on a network site and an index time corresponding to a time used for calculating the index value, receiving an update index time corresponding to a time used for updating the index data, determining an updated index value using an exponential decay of the index value from the index time to the update index time, where the updated index value comprises a decayed value of the index value corresponding to the update time, and storing updated index data including the updated index value and the update index time.

In some embodiments, provided is a system that includes a processor and an index processing module executable by the processor to: receive index data, including an index value indicative of user activity on a network site and an index time corresponding to a time used for calculating the index value, receive an update index time corresponding to a time used for updating the index data, determine an updated index value using an exponential decay of the index value from the index time to the update index time, where the updated index value comprises a decayed value of the index value corresponding to the update time, and store updated index data including the updated index value and the update index time.

BRIEF DESCRIPTION OF THE DRAWINGS

FIG. 4 is a block diagram that illustrates an exemplary indexing system in accordance with one or more embodiments of the present technique.

Figure 1:
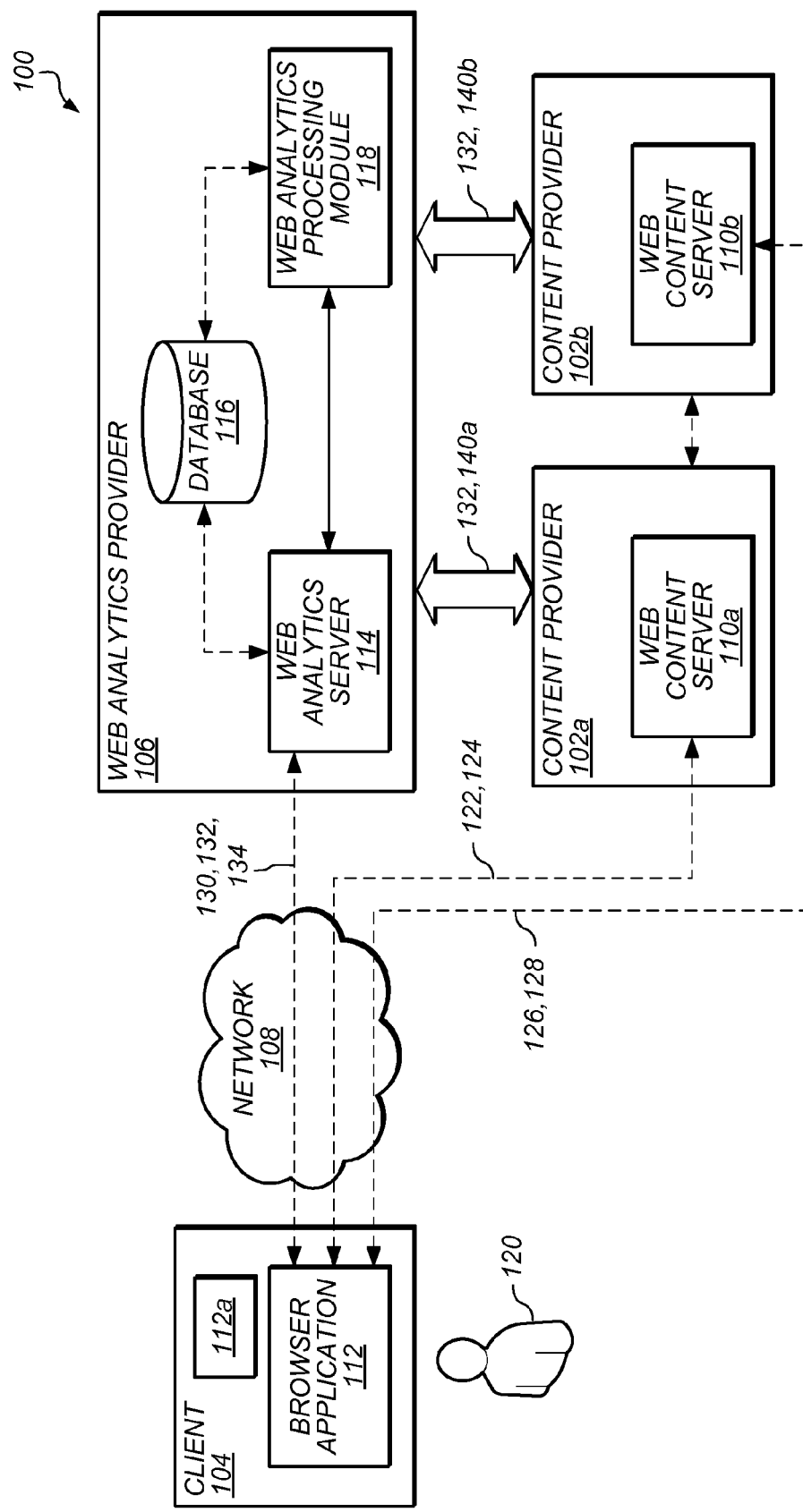
FIG. 1 as a block diagram that illustrates an exemplary web analytics system in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF EMBODIMENTS

As described in more detail below, provided in some embodiments are systems and methods for efficiently managing (e.g., receiving, storing and processing) web-analytics data. In some embodiments, an index value is generated to represent a set of web analytics data (e.g., a web analytics dataset). In certain embodiments, for example, a single index value is generated to represent a set of historical web analytics data over a given period of time. In some embodiments, a single index value may be generated for each of a plurality of metrics corresponding to the set of web analytics data. In certain embodiments, the index value is iteratively updated to reflect the receipt of additional web-analytics data. In some embodiments, the index value is iteratively updated based on decay (e.g., exponential half-life decay) of the index value over a given period of time. Employing a decay of the index value may reduce the influence of older web-analytics data on the index value, while increasing the influence of more recent web-analytics data on the index value.

In certain embodiments, an index value is stored in association with a timestamp that corresponds to the index value. The time stamp may enable a decay to be applied to the index value based on the timestamp and a corresponding time for updating the index value (e.g., a decay of the index from a first time to a second time). In certain embodiments, index data (e.g. index values and their corresponding timestamps) are stored at a client such that they can be accessed and used by various entities, such as content providers. In some embodiments, for example, index data may be stored in a cookie of a client's web browser. In certain embodiments, a content provider may access the index data stored in the cookie to determine information about the client and/or serve particular/customized content to the user based on the index data. In some embodiments, a plurality of entities such as content providers and a web analytics provider can access and update the index data. In certain embodiments, index data may be stored at other network locations, including, for example, a web analytics data base.

In certain embodiments, a plurality of index values are generated, each corresponding to a given metric. In some embodiments, index data may include a plurality of index sets (e.g., index values and the corresponding timestamp), each corresponding to a given metric, such that the index data may be used to determine a plurality of different metrics. In certain embodiments, multiple index sets are stored in a single cookie at the client.

As described herein, the reduced size of index data, at least relative to the dataset which it represents, may facilitate storage of the index data in locations for which it would be impractical to store dataset. For example, index data may be store within a 4 kilobyte cookie while providing enough data to generate metrics that represent a large web analytics dataset. Such flexibility may enable storage of the information in locations that are readily accessible by various entities. For example, in the context of a web-analytics system, index data stored within a cookie of a client's web browser may be accessible by both of a content provider and/or a web-analytics provider. Thus, the web analytics provider may access and update the index data as more web analytics data is received, and the content provider may access the index data, for example, to determine how and what content to serve to the client's browser. Moreover, an index value that is based on exponential decay over time may enable the index value to provide a representation of the entire web analytics dataset for a given metric, while also proving a time-based weighting that lends increased relevancy to more recent activity/data. In some embodiments, the time-weighting aspect may be adjusted by simply increasing or decreasing an exponential decay (e.g., increasing or decreasing a half-life of exponential decay).

Turning now to the figures, FIG. 1 is a block diagram that illustrates a web analytics system 100 in accordance with one or more embodiments of the present technique. In the illustrated embodiment, system 100 includes content providers 102a and 102b, a client 104 and a web analytics provider 106. Each of content providers 102a and 102b, client 104 and web analytics provider 106 may be communicatively coupled to one another via a network 108. Network 108 may include any channel for providing effective communication between each of the entities of system 100. In some embodiments, network 108 includes an electronic communication network, such as the internet, a local area network (LAN), a cellular communications network, or the like. Network 108 may include a single network or combination of networks that facilitate communication between each of the entities (e.g., content providers 102a and 102b, client 104 and web analytics provider 106) of system 100.

Content providers 102a and/or 102b may include source of information/content (e.g., a Hyper Text Markup Language (HTML) file defining display information for a webpage) that is provided to client 104. For example content providers 102a and/or 102b may include vendor websites used to present retail merchandise to a consumer. In some embodiments, content providers 102a and 102b may include respective web content servers 110a and 110b. Web content servers 110a and 110b may include web content stored thereon, such as HTML files that are accessed and loaded by client 104 for viewing webpages of content providers 102a and 102b. In some embodiments, content providers 102a and 102b may serve client 104 directly. For example, content may be provided from each of servers 110a or 110b directly to client 104. In some embodiments, one of content providers 102a and 102b may act as a proxy for the other of content providers 102a and 102b. For example, server 110a may relay content from server 110b to client 104.

Client 104 may include a computer or similar device used to interact with content providers 102a and 102b. In some embodiments, client 104 may include a browser application (e.g., internet web browser application) 112 that can be used to generate a request for content, to render content, and to communicate request to various devices on the network. For example, upon selection of a website link on a webpage displayed to the user by browser application 112, browser application 112 may submit a request for the corresponding webpage/content to web content server 110a, and web content serve 110a may provide a corresponding HTML file that is executed by browser application 112 to render the requested website for display to the user. In some instances, execution of the HTML file may cause the browser to generate additional request for additional content (e.g., an image referenced in the HTML file as discussed below) from a remote location, such as content providers 102a and 102b and/or web analytics provider 106. The resulting webpage 112*a* may be viewed by a user via a monitor or similar presentation device at client 104.

Web analytics provider 106 may include a system for the collection and processing of web analytics data, and the generation of corresponding web analytics reports including various metrics of the web analytics data. Web analytics data may include data that describes usage and visitation patterns for websites and/or individual webpages within the website. Web analytics data may include information relating to the activity and interactions of one or more users with a given website or webpage. For example, web analytics data may include historic and/or current website browsing information for one or more website visitors, including, but not limited to identification of links selected, identification of web pages viewed, identification of conversions (e.g., desired actions taken—such as the purchase of an item), number of purchases, value of purchases, impression data (e.g., page views or ad-impressions), and other data that may help gauge user interactions with webpages/websites. In some embodiments, web analytics data is accumulated over time to generate a set of web-analytics data (e.g., a web analytics dataset) that is representative of activity and interactions of one or more users with a given website or webpage. Web analytics data may be processed to generate metric values that are indicative of a particular trait or characteristic of the data (e.g., impressions, number of items purchased, value of items purchased, a conversion rate, etc.). In some embodiments, some, substantially all, or all of the web analytics data may be accounted for in a single index value corresponding thereto, as discussed below.

Web analytics provider 106 may include a third-party website traffic statistic service. Web analytics provider 106 may include an entity that is physically separate from content providers 102*a* and 102*b*. Web analytics provider 106 may reside on a different network location from content providers 102*a* and 102*b* and/or client 104. In the illustrated embodiment, for example, web analytics provider 106 is communicatively coupled to client 104 via network 108. Web analytics provider may be communicatively coupled to content providers 102*a* and 102*b* (e.g., via network 108). Web analytics provider 106 may receive web analytics data from client 104 via network 108 and may provide web-analytics data (e.g., web analytics reports) to content provider 102*a* and 102*b* via network 108 or some other form of communication.

In the illustrated embodiment, web analytics provider 106 includes a web analytics server 114, a web analytics database 116, and a web analytics processing module 118. Processing module 118 may include computer executable code (e.g., executable software modules), stored on a computer readable storage medium that is executable by a computer to provide associated processing. For example, processing module may process web analytics datasets stored in database 116 to generate corresponding web analytics reports that are provided to content providers 102*a* and 102*b*.

Web analytics server 114 may service requests from one or more clients. For example, upon loading/rendering of a webpage 112*a* by browser 112 of client 104, browser 112 may generate a request to web analytics server 114 via network 108. Web analytics server 114 and/or processing module 118 may process the request and return appropriate content (e.g., an image) to browser 112 of client 104. In some embodiments, the request includes a request for an image, and web analytics provider 106 simply returns a single transparent pixel for display by browser 112 of client 104, thereby fulfilling the request. The request itself may also include web analytics data embedded therein. Some embodiments may include a content provider embedding a pointer to a resource, known as a "web bug", within the HTML code of the webpage 112*a* provided to the client. The resource may be invisible to the user, such as a transparent one-pixel image. The pointer may direct browser 112 of client 104 to request the resource from web analytics server 114. Web analytics server 114 may record the request and any additional information associated with the request (e.g., the date and time, and/or identifying information that may be encoded in the resource request).

In some embodiments, an image request embedded in the HTML code of the webpage may include codes/strings that are indicative of web analytics data, such as data about a user/client, the user's computer, the content of the webpage, or any other web analytics data that is accessible and of interest. A request for an image may include, for example, "image.gif/XXX . . . " wherein the string "XXX . . . " is indicative of the web analytics data. Web analytics provider 106 may parse the request (e.g., at server 114 or processing module 118) to extract the web analytics data contained within the request. The web analytics data may be stored in web analytics database 116, or a similar storage/memory device. In some embodiments, processing module 118 may receive or retrieve web analytics data from web analytics server 114 and/or database 116. Web analytics processing module 118 may process the web analytics data to generate one or more web analytics reports. For example, web analytics report module 114 may filter the raw web analytics data received at web analytics server 114 to generate concise and complete web analytics reports, as may be requested by a website administrator of one of content providers 102*a* and 102*b*. Reports, for example, may include overviews and statistical analyses describing the relative frequency with which various site paths are being followed through the content provider's website, the rate of converting a website visit to a purchase (e.g., conversion) and so forth.

In some embodiments, a user 120 interacts with a device at client 104 to execute a software application, such as browser application 112 of client 104, for accessing and displaying one or more webpages 112*a*. In response to a user command, such as clicking on a link or typing in a uniform resource locator (URL), browser application 112 may issue a webpage request 122 to web content server 110*a* of content provider 102*a* via network 108 (e.g., via the Internet). In response to request 122, web content server 110*a* may transmit the corresponding webpage code 124 (e.g., HTML code corresponding to webpage 112*a*) to browser application 112. Browser application 112 may interpret the received webpage code 124 to display the requested webpage 112*a* to user 120 at a user interface (e.g., monitor) of client 106. Browser application 112 may generate additional requests for content from the servers, or other remote network locations, as needed. For example, if webpage code 124 calls for content, such as an advertisement, to be provided by content provider 102*b*, browser application 112 may issue an additional request 126 to web content server 110*b*. Web content server 110*b* may provide a corresponding response 128 containing the requested content, thereby fulfilling the request. Browser application 112 may assemble the additional content for display within webpage 112*a*.

In some embodiments, client 104 also transmits webpage visitation tracking information to web analytics provider 106. For example, as described above, webpage code 124 may include executable code (e.g., a web bug) to initiate a request for data from web analytics server 114 such that execution of webpage code 124 at browser 112 causes browser 112 to generate a corresponding request 130 for the data to web analytics server 114. In some embodiments, request 130 may itself have web analytics data contained/embedded therein, or otherwise associated therewith, such that transmitting request 130 causes transmission of web analytics data from client 104 to web analytics provider 106. For example, as described above, request 130 may include an image request having an embedded string of data therein. Web analytics provider 106 may process (e.g., parse) request 130 to extract web analytics data 132 contained in, or associated with, request 130. In some embodiments, request 130 from client 104 may be forwarded from server 114 to database 116 for storage and/or to web analytics processing module 118 for processing. Web analytics processing module 118 and/or server 114 may process the received request to extract web analytics data 132 from request 130. Where request 130 includes a request for an image, web analytics server 114 may simply return content/image 134 (e.g., a single transparent pixel) to browser 112, thereby fulfilling request 128. In some embodiments, web analytics server 106 may transmit web analytics data and/or a corresponding web analytics reports to content providers 102a and/or 102b, or other interested entities. For example, web analytics data 132 and/or web analytics reports 140a and 140b (including processed web analytics data) may be forwarded to site administrators of content providers 102a and 102b via network 108, or other forms of communication. In some embodiments, a content provider may log-in to a website, or other network based application, hosted by web analytics provider 106, and may interact with the website/application to generate custom web analytics reports. For example, content provider 102a may log into a web analytics website via website server 114, and may interactively submit request 142 to generate reports for various metrics (e.g., number of conversions for male users that visit the home page of the content provider's website), and web analytics provider 106 may return corresponding reports (e.g., reports dynamically generated via corresponding queries for data stored in database 116 and processing of the data via module 118). In some embodiments, content providers 102a and 102b may provide web analytics data 132 to web analytics provider 106.

In some embodiments, reports may include one or more metric values that are indicative of a characteristic/trait of a set of data. For example, a report may include a purchase value metric that represents monetary value of purchases by one or more consumers over a given period of time. The purchase value metric may be generated by processing a large web analytics dataset for the given time period to extract purchases, determining a total value for the purchases based on the processing, and generating the corresponding purchase value metric. The purchase value metric may be used, for example, to determine what type of webpage content should be provided to one or more consumers based on their purchase history, as indicated by the purchase value metric. For example, where the consumer has requested to view a webpage, a first advertisement—for a high priced product—may be provided for display with the webpage if the purchase value metric associated with the particular consumer or the consumer's demographic exceeds a threshold value, or a second advertisement—for a lower priced product—may be provided for display with the webpage if the purchase value metric associated with the particular consumer or the consumer's demographic does not exceed the threshold value. Such an embodiment may require retrieving and processing a large amount of data each time a query for a metric is received.

In some embodiments, an index value is used to represent some or all of a set of data. For example, a single index value may be calculated for an entire web analytics dataset. The index value may correspond to a particular metric for the set of data. For example, where a dataset contains data for a plurality of purchases, purchase value index may represent monetary value of purchases by one or more consumers over a given period of time. An index value may be used as a metric, or may be used to compute a corresponding metric. In some embodiments, index values corresponding to a dataset may be used in place of the dataset itself. For example, a single index value corresponding to a given dataset may be stored and processed (e.g., iteratively updated) to provide a single value that is representative of the entire dataset, as opposed to having to store and process the entire dataset each time a metric is requested.

As described herein, the content provider may use an index value, such as that stored in a cookie of a client, to make dynamic decisions as to what content is provided to the client by simply accessing and/or storing the index value, and may not require a query of the corresponding dataset. For example, upon receiving a query for a total amount of purchases by a consumer, the index value (or some variant thereof) may be provided. Such a technique may be advantageous as a single index value may be stored in place of a large dataset and/or processing may be limited to the single index value and/or minimal additional data (e.g., for new activity), as opposed to storing/processing a large set of data (e.g., historical web analytics data) to generate the requested metric. Accordingly, the use of an index value may eliminate some of the complexities associated with generating a metric base on a web analytics dataset.

An index data may be updated iteratively over time to maintain an accurate representation of the dataset. The iterations may take into account changes in the underlying dataset, incorporating relevant data that has been received between the time the index data was last updated and the current time for updating the index value. For example, where index data was last updated in January $1^{st}$, and new activity data relevant to the index is received on January $31^{st}$, an update of the index data on or after January $31^{st}$ may adjust the index data (e.g., an index value and corresponding timestamp) to reflect the new activity data. This iterative approach may ensure that the index data continues to accurately represent the dataset over time. In some embodiments, an index value may be updated periodically (e.g., once an hour, day, week, month, etc.) or based on some event (e.g., receipt of new data, a user request for a corresponding metric, etc.).

Index data may be updated iteratively over time to account for defined variations in the value of the index. For example, an index value may be subject to time-weighting to account for temporal relevancy of an index value and activity associated therewith. In some embodiments, a time-weighting may reduce the impact of older activity data on an index value and/or increase the impact of more recent activity data on the index value. For example, an index value may be subject to an exponential decay over time, such that contributions due to a particular activity are reduced as time progresses. In some embodiments, the index value is based on a half-life exponential decay. For example, where an index has a value of ten on day one and is subject to a half-life of fifty days, if the index value is updated on day fifty, the index value will be reduced by half such that it has a value of five (assuming no additional activity relevant to the index value was reported between day one and fifty).

An updated index value may be generated based on a previously calculated index value, and relevant activity data, if any, that was not accounted for in the prior calculation of the index value. Accordingly, an initial index value may be based on a given dataset representative of activity data, however, subsequent iterations of the index value (e.g., an updated index value) may be determined based on the prior iteration of the index value, any additional activity data received (or otherwise not accounted for in the prior iteration of the index value), and/or application of any defined variations (such as half-life exponential decay). Notably, although the index value may be representative of an entire dataset, the dataset itself may not need to be accessed as each iteration of the index value provides a running representation of the entire dataset.

In some embodiments, an updated index value for user interaction with a network site (e.g., a website) may be generated by: (1) receiving index data that includes: (a) an index value indicative of prior user activity on the site, and (b) an index time corresponding to a time used for calculating the index value, (2) receiving an update index time corresponding to a time used for updating the index data, (3) determining an updated index value, including a decayed value of the index value corresponding to the update time, using an exponential decay of the index value from the index time to the update index time. In some embodiments, the updated index value may incorporate additional data/activity that was not accounted for in the previously determined index value (e.g., activity data received subsequent to determining the index value may be added to the decayed value). The updated index data (including the updated index value and the update index time) may be output for storage, for inclusion in a web analytics report, or use in subsequent processing. As noted above, the updated index value may be determined using a half-life exponential decay of the index value from the index time to the update index time. The half-life exponential decay of the index value from the index time to the update index time may be determined in accordance with the following relationship of equation (1):

$$I(t) = I_o \left(\frac{1}{2}\right)^{\frac{(t-t_o)}{t_{1/2}}} \quad (1)$$

where I(t) is the index value at the update index time (t), $I_o$ is the index value at the index time ($t_o$), and $t_{1/2}$ is a specified half-life. In other embodiments, different exponential decays may be used other than half-life. For example, an exponential decay based on other exponents (e.g., 10 or e) may be used, with proper coefficients. During operation, the index value (I(t)) may be stored in association with the update index time (t) such that they can be accessed in a future iteration to determine a subsequent (e.g., updated) index value. For example, an index set, including: (a) the index value (I(t)) and (b) the update index time (t) may be stored in a memory location, such as a cookie, of a client's computer. Although not shown in equation (1), any new activity data (or value representing new activity) may be added on the right side of the equation such that I(t) is equal to the decayed previous value plus new activity.

Figure 2:
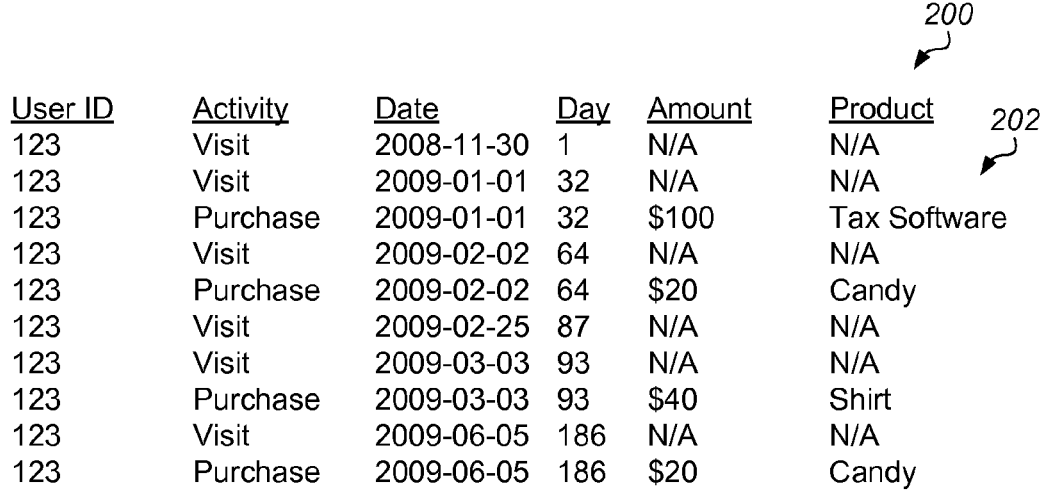
FIG. 2 is a table that depicts an exemplary web analytics dataset, in accordance with one or more embodiments of the present technique.

FIG. 2 is a table 200 that depicts an exemplary web analytics dataset 202, in accordance with one or more embodiments of the present technique. Dataset 202 may be indicative of at least a portion of activity by user (e.g., website visitor) 120 on a retail website of content provider 102a (e.g., a website that sells tax software, candy, shirts, etc.). With regard to FIG. 1, dataset 202 may be represent at least a portion of web-analytics data 132 that is transmitted to web analytics provider 106 from client 104 via request 130. For example, as user 120 browses and interacts with web pages of a website operated by content provider 102a, the client's browser application 104 may generate request 130 having activity data and/or index data embedded therein, and web analytics provider 106 may parse the request to generate and store dataset 202 in database 116.

In an exemplary embodiment, content provider 102a, or other entities, may be interested in tracking the number and value of purchases by visitors to their website. Such information may be of interest, for example, to enable content provider 102a to serve customized content to user 120 based at least in part on their past browsing activity. Based on the desire to track the number and value of purchases, relevant activity data may include purchases made by a particular user. For example, with regard to dataset 202, relevant activity data for a user having an ID of "123" may include the "purchases" activities of dataset 202, as these include an actual purchase as well as a monetary value of the purchase. Based on this activity data, an index value for the number of purchases by the user ("purchase number index") may be incremented by "1" for each of the respective purchases. Similarly, an index value for the monetary amount of purchases by the user ("purchase amount index") may be incremented by the amount for each of the respective purchases (e.g., $100, $20, $40 and $20). A resulting index value may be generated for each of the metrics of interest (e.g., a purchase number index and a purchase amount index).

If no time-weighting is applied to the index values, each of the value may simply increase by the corresponding value as the purchase transaction take place. For example, the purchase number index would theoretically increase iteratively from 0 to 4 as the four purchases of transactions occur. Similarly, the purchase amount index would theoretically increase from 100 to 120 to 160 to 180, as the purchase transactions occur. Notably, the term "theoretically" is used, as the actual calculation/realization of the index value may occur at some later time, although the index value would theoretically increase at the instant of the corresponding activity—e.g., if the value were continuously updated.

The index values and/or the corresponding activity data may be subject to time-weighting to account for the temporal relevancy of associated activity. As described above, in some embodiments, a time-weighting may reduce the impact of older activity data on the index value and/or increase the impact of more recent activity data on the index. For example, an index value may be subject to an exponential decay over time, such that contributions due to a particular activity are reduced as time progresses. In some embodiments, the index value is based on a half-life exponential decay.

Figure 3A:
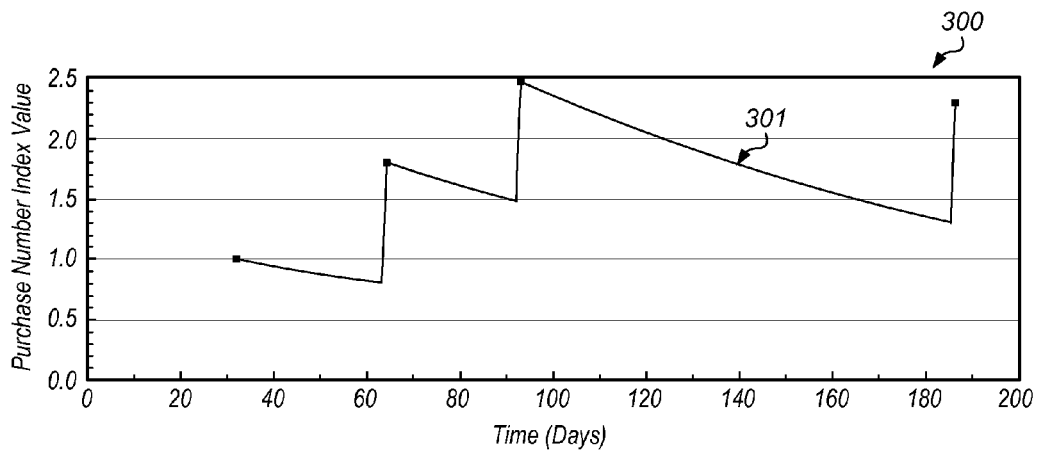
FIGS. 3A-3C are exemplary charts depicting variations of index values over time based on corresponding activity data and exponential decay, in accordance with one or more embodiments of the present technique.
Figure 3B:
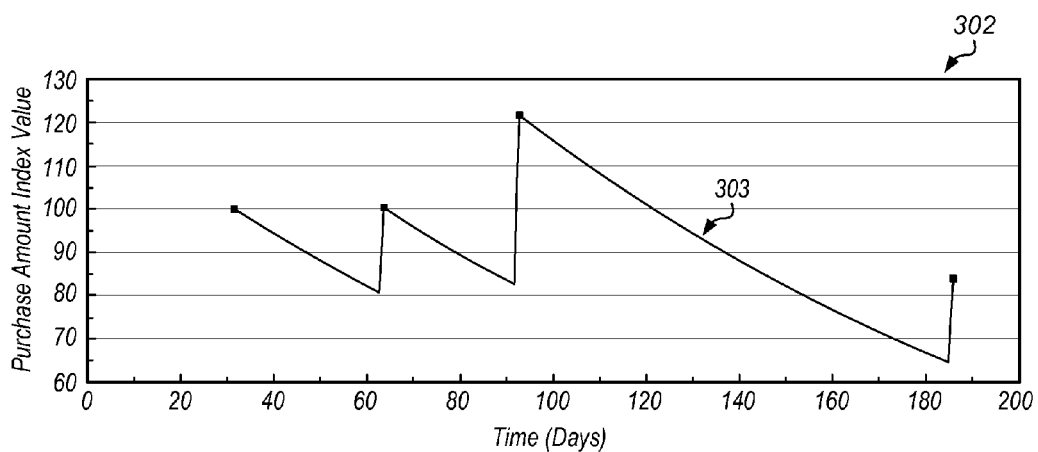
Figure 3C:
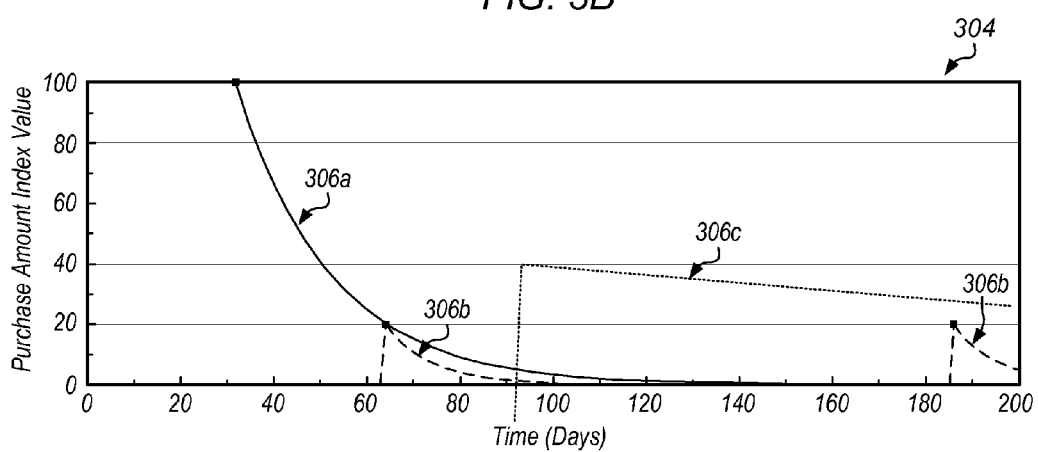

FIGS. 3A-3C are exemplary charts 300, 302 and 304 depicting variation of index values over time based on corresponding activity data and exponential decay, in accordance with one or more embodiments of the present technique. Chart 300 of FIG. 3A depicts a curve 301 representing the theoretical value of the purchase number index for dataset 202 of FIG. 2. Chart 302 of FIG. 3B depicts a curve 303 representing the theoretical value of the purchase amount index for dataset 202 of FIG. 5. Chart 304 of FIG. 3C depicts curves 306a-306c for individual purchase amount index values associated with particular ones of the items for dataset 202 of FIG. 5. Notably, in the illustrated embodiment of chart 304, each of the different types of index values are subject to varying half-life values. For example, curve 306a represents a tax software purchase having an associated half-life of fourteen days, curves 306b represent candy purchases having an associated half-life of seven days, and curve 306c represent a shirt purchase having an associated half-life of two-hundred days.

Each of charts 300, 302 and 304 represent tracking of the respective index values for two-hundred days, beginning Nov. 30, 2009 (day 1). The charts reflect the activity data of dataset 202, indicating that no purchases were made during the first thirty-one days of tracking such that the purchase number index and the purchase amount index remained at a value of zero. Reflective of the purchase of "tax software" for $100 on Jan. 1, 2009 (day thirty-two), the purchase number index increased to a value of one to reflect the purchase of one item (i.e., tax software), and the purchase amount index increased to a value of one-hundred to reflect the $100 purchase price of the tax software. The respective increments of one and one-hundred were added to the value of each index at the time of the purchase. Notably, the value of each of the indices decays exponentially following the reported activity data. More specifically, each of the indices is subject to half-life exponential decay in accordance with the relationship of equation (1). In the illustrated embodiment, the half-life ($t_{1/2}$) is equal to one-hundred days. Accordingly, if no additional purchases or monetary spending were to take place after the purchase of Jan. 1, 2009 (day thirty-two), the indices would decrease to one-half of their value (e.g., 0.5 and fifty) over the next one-hundred days (e.g., on day one-hundred thirty-two).

In the illustrated embodiment, the spikes in the respective index values reflect subsequent activity data (e.g., purchase transactions) that influence both of the purchase number index and the monetary amount index value. For example, where activity data is received indicating the purchase of "candy" for $20 on Feb. 2, 2009 (day sixty-four), the purchase number index increased by a value of one to reflect the purchase of one item (i.e., candy), and the purchase amount index increased by twenty to reflect the $20 purchase price of the candy. The respective increments of one and twenty are added to the current value of the respective index at the time of the purchase (i.e., on day sixty-four). For example, based on the occurrence of the purchase at day sixty-four (thirty-two days after the preceding purchase) and the half-life of one-hundred days, the initial value of the indices is decreased by about 20% in accordance with the relationship of equation (1). For example, immediately prior to consideration of the purchase on Feb. 2, 2009, the purchase number index decayed to a value of about 0.8 and the purchase amount index decayed to a value of about eighty. Aggregating the purchase on Feb. 2, 2009 increments the purchase number index by one from 0.8 to about 1.8 and increases the monetary amount index value by twenty, from about eighty to about one-hundred. Notably, the value of each of the indices continues to decay exponentially as time progress.

A similar technique may be used for aggregating subsequent purchases into the running value of each of the indices. For example, as depicted in charts 600 and 602 the purchase number index and the purchase amount index are subject to spikes/increments corresponding to the purchase of a "shirt" for $40 on Mar. 3, 2009 (day ninety-three) and the purchase of a "candy" for $20 on Jun. 5, 2009 (day one-hundred eighty-six). Moreover, the indices are subject to an on-going half-life exponential decay.

Although the above described embodiments depict a continuous/running value for each of the indices, in practice the value for any given index is not typically calculated on a continuous basis. In other words, the continuous values depicted above represent values which would exist at each time if the calculation was performed at that time. In practice, the values may only be calculated and stored when an update is performed such that values for times between updates are not actually calculated directly. Some embodiments may include calculating the actual value of one or more of the indices, or otherwise updating corresponding index data, periodically and/or at any given point in time (e.g., in response to some form of activity or query for an index value). In some embodiment, for example, an updated index value may be calculated every fifty days and/or in response to receiving activity data corresponding to one or more of the indices. In the above described embodiment, for example, a periodic update every fifty days may include updating the index value on day fifty, day one-hundred and so forth. At day fifty the indices may reflect the purchase of "tax software" for $100 on Jan. 1, 2009 (day thirty-two). At day fifty, based on decay from day thirty-two to day fifty, the purchase number index and the purchase value index may decay to about 88% of their values (e.g., 0.88 and eighty-eight). At day one-hundred, the purchase number index and the purchase value index may be determined based on the previously calculated index value and intervening activity, including the purchases of Feb. 2, 2009 (day 64) and Mar. 3, 2009 (day ninety-three). Each of the values may be aggregated by determining their individual contributions to the index value and adding them together. For example, with regard to the purchase number index, the previously calculated value of about 0.88 may be associated with the time it was calculated (e.g., day fifty), a value of one may be associated with each of the purchases on days sixty-four and ninety-three. At the time of updating the index values (day one-hundred), the previously calculated value of 0.88 will have a decayed value of about 0.62, the value of one associated with the purchase on day sixty-four will have a decayed value of about 0.77, and the value of one associated with the purchase on day ninety-three will have a decayed value of about 0.95. These values may be aggregated (e.g., added) to generate an updated purchase number index having a value of about 2.34, as depicted in FIG. 3A.

Figure 6:
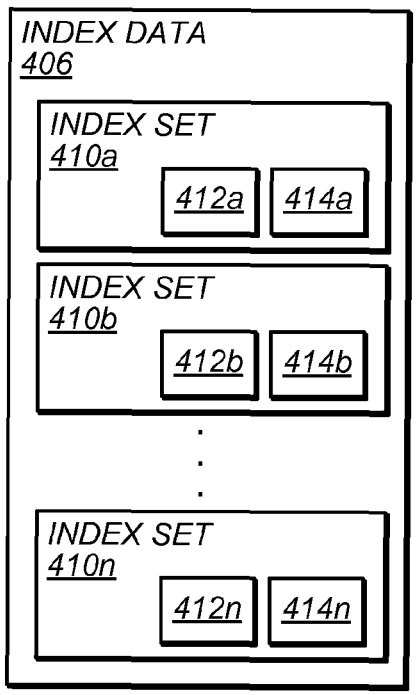
FIG. 6 is a block diagram that illustrates an exemplary representation of index data in accordance with one or more embodiments of the present technique.

With regard to the purchase amount index, the previously calculated monetary amount index value of about eighty-eight may be associated with the time it was calculated (e.g., day fifty), a value of twenty may be associated with the purchase on day sixty-four and a value of forty may be associated with the purchase on day ninety-three. At the time of updating (day one-hundred), the previously calculated value of eighty-eight will have a decayed value of about sixty-two, the value of twenty associated with the purchase on day sixty-four will have a decayed value of about fifteen, and the value of forty associated with the purchase on day ninety-three will have a decayed value of about thirty-eight. These individual values may be aggregated (e.g., added) to generate an updated purchase amount index having a value of about one-hundred fifteen, as depicted in FIG. 6. Updated values for subsequent times (e.g., days one-hundred fifty, two-hundred and so forth) may be calculated in a similar manner.

Although the above embodiment describe updating index data on a periodic basis, similar updates may be performed at any time by aggregating the individual contributions of previously calculated index value(s) and/or more recent activity data (e.g., purchases) that are not account for in the previously calculated index values. In some embodiments, a similar technique may be employed that generates an updated index data each time relevant activity is received. For example, in the above described embodiment, updated index values may be generated at each of day thirty-two, day sixty-four, day ninety-three, and day one-hundred eighty-six. In each of these updates, the value and time of the previously calculated index value may be used to determine the decayed value of the previously calculated index at the particular time, and the increment associated with the given activity (subject to any appropriate decay) may be added to the decayed value of the previously calculated index to generate an updated index value that takes into consideration, the previously calculated index value subject to decay and the impact of the associated activity on the index value (also subject to any appropriate decay). Such a technique may employed in a manner similar to that for calculating index values on days thirty-two, sixty-four, ninety-three and one-hundred-eighty-six, as described above. For example, if the purchase number index were to be calculated upon receiving an indication of the purchase on day ninety-three, the previously calculated index (already accounting for purchases at days thirty-two and sixty-four) would have a decayed value of about 1.5, and the additional value of one may be added to the value to generate an updated value of about 2.5 on day ninety-three.

As noted above, an index value may be indicative of a metric associated with a dataset. For example, in the above described embodiment, the updated purchase number index calculated on day one-hundred may be representative of a dataset that includes purchases on days thirty-two, sixty-four and ninety-three. Accordingly, the index data/value may be referred to as a cumulative index data/value as it may be indicative of a plurality of different activities (e.g., activated on days thirty-two, sixty-four and ninety-three).

Although the above technique is described with regard to calculating a current index value based on an prior index value (e.g., a cumulative value) and adding the contributions of subsequent or un-accounted for activity thereto to generate an index value at a given point in time, it will be appreciated that a similar result may be accomplished via summing the contributions of individual portions of the activity data. For example, for the purchase number index on day ninety-three, may be calculated by determining the decayed value associated with each of the transactions on day ninety-three and summing them. For example, on day ninety-three, a first purchase index value attributed to the purchase on day thirty-two would have a decayed value of about 0.7, a second purchase index value attributed to the purchase on day sixty-four would have a decayed value of about 0.8 and a third purchase index value attributed to the purchase on day ninety-three would have a decayed value of one (as it has not yet been subject to decay). The first, second and third purchase index values could be added to provide a cumulative purchase index value of about 2.5 on day ninety-three.

In some embodiments, time-weighting may be varied to control the decay of an index value. Moreover, time-weighting may be varied from one type of activity data to another to vary the impact of different types of activities on a given index value. For example, although the exemplary embodiments described herein include a half-life of one-hundred days that is constant over the observed period for each of the purchase number index and the purchase amount index, the half-life value may be varied to provide for variations of the time-based weighting. For example, the half-life may be increased/decreased such that older data is given more/less relevance in a calculation of an index value. In some embodiments, the half-life may be different for one or more of the indices. For example, the purchase number index may be based on a half-life of one-hundred days and the purchase amount index may be based on a half-life of fifty-days. In some embodiments, the half-life may be changed at any given time. For example, the purchase number index may be based on a half-life of one-hundred between day zero and day sixty-four, and on day sixty-four, the half-life maybe changed to fifty such that decay of the index before day sixty-four is based on a half-life of one-hundred and decay of the index after day sixty-four is based on a half-life of fifty. In some embodiments, a half-life may be different for a given type of activity. Purchases of a seasonal item may be subject to a shorter half-life than a non-seasonal item. For example, purchase of Easter candy may be subject to a half-life of seven days, where a shirt may be subject to a half-life of two-hundred days. As described herein, the individual contributions of activities (e.g., purchase of Easter candy and shirts) of varying characteristics (e.g., different half-life values) may be determined individually and aggregated to generate any desired index value (e.g., purchase value index). The half-life may be provided in terms of any time increment (e.g., seconds, hours, days, weeks, months, year, etc.).

As described above, index values may be used to represent an entire set of data. In the context of a web analytics system, for example, an index value may be used to directly represent a given metric for an entire set of web analytics data. As described above, an index may be iteratively updated based on activity data such that is continues to reflect the entire dataset, as well as additional data added thereto. Moreover, an index value may be subject to time-weighting (e.g., half-life exponential decay) such that the impact of activity data is varied based on its temporal relevance. In the context of web analytics for example, exponential decay may ensure that more recent web activity has a greater influence on the index value. Index values may also prove advantageous, as their relatively small size may allow them to be stored and processed efficiently.

FIG. 4 is a block diagram that illustrates a web analytics indexing system 400 in accordance with one or more embodiments of the present technique. Indexing system 400 includes an indexing processing module 402. As depicted indexing processing module 402 may be provided within web analytics provider 106. For example, index processing module 402 may include one or more processing modules of web analytics processing module 118.

During use, index processing module 402 may receive activity data 404 and/or index data 406 and generate corresponding updated index data 408 based at least in part on the received activity and/or index data. Updated index data 408 may be stored in place of corresponding portions of index data 406 such that subsequent iterations of updating the index data are based on the updated index data.

Figure 5:
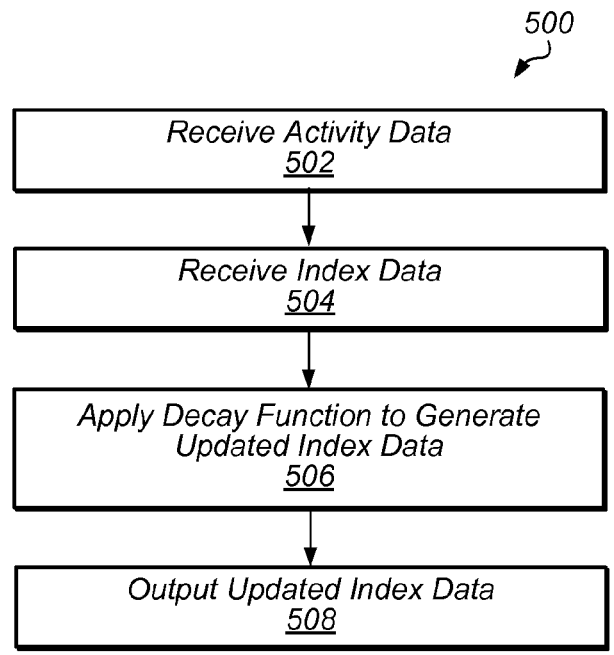
FIG. 5 is a flowchart that illustrates a method of updating indexing data in accordance with one or more embodiments of the present technique.

FIG. 5 is a flowchart that illustrates a method 500 of updating indexing data in accordance with one or more embodiments of the present technique. Method 500 generally includes receiving activity data, receiving index data, applying a decay function to generate updated index data, and outputting the updated index data. Method 500 may be implemented by index processing module 402 of indexing system 400.

Method 500 may include receiving activity data, as depicted at block 504. Activity data may include data that is traditionally stored to a dataset. In the context of web analytics, activity data may include raw web analytics data that is forwarded to a web analytics provider for processing. For example, receiving activity data may include receiving some or all of activity data 202 of table 200. In some embodiments, activity data may be received from a client or other source of web analytics data. For example, as described with respect to FIG. 1, where content provider 102a desires to track of the number and value of purchases by a consumer, in response a request 122 for webpage, content provider 102a may provide content 124 (e.g., a webpage 112a) that causes browser application 112 to generate a request 130 that includes web analytics data 132, embedded therein. Web analytics data 132 may be indicative of at least a number and monetary value of purchases made by the consumer on the content provider's website. Upon receipt of request 130, web analytics server 114 and/or web analytics processing module 118 may parse the request to extract web analytics data 132 including the activity data 404.

Activity data 404 may be used to build a database of web analytics data. In some embodiments, activity data is accumulated into a dataset. For example, in the illustrated embodiment, activity data may be added to a dataset 209 that is stored in database 116 of web analytics provider 106. Dataset 409 may be the same or similar to dataset 202. For example dataset 409 may be expanded iteratively to include activity data (e.g., activity data 404) for each of the "visit" and "purchase" activities as they occur and/or the corresponding activity data is transmitted and received (e.g., via request 130). Dataset 409 may initially include historic data (e.g., previously received activity data) to which more recent activity data (e.g., activity data 404) is added. In accordance with the techniques described herein, index data 406 may correspond to a "historic" version of dataset 409 that does not yet include activity data 404, and updated index data 408 may correspond to an "updated" version of dataset 409 that includes the more recent activity data 404. Although the illustrated embodiment depicts receiving activity data 404 from client 104, activity data 404 may be received from another source/entity, such as dataset 409 of database 116. For example, where activity data 404 is written to dataset 409, such that dataset 409 includes activity that has not yet been applied to corresponding index data, more recent activity data may be retrieved from dataset 409 for calculating an updated index data.

Method 500 may include receiving index data, as depicted at block 504. Index data 406 may include one or more index sets that each defines an index value and a time corresponding to the determination of the respective index value. For example, with regard to the exemplary dataset 202 of FIG. 2, a first index set for a purchase number index calculated on day sixty-four may include an index value of about 1.8 and a corresponding timestamp of sixty-four. A second index set for a purchase amount index calculated on day sixty-four may include an index value of about one-hundred and a corresponding timestamp of sixty-four.

FIG. 6 is a block diagram that illustrates an exemplary representation of index data 406 in accordance with one or more embodiments of the present technique. In the illustrated embodiment, index data 406 includes a plurality of index sets 410a-410n (collectively referred to as index sets 410) that each defines respective index values 412a-412n (collectively referred to as index values 412) and respective timestamps 414a-414n (collectively referred to as timestamps 414) corresponding to times of the determination of the index value of the set. Where the number and amount of purchases by a visitor are being tracked, index set 410a may correspond to a purchase number index and index set 410b may correspond to the purchase amount index. Index set 410a may include, for example, an index value 412a representing the number of purchases by a visitor and a timestamp 414a. Index set 410b may include, for example, an index value 412b representing the value of purchases by the visitor and a timestamp 412b. As indicated by index set 410n, index data may include any number of index sets corresponding to any variety of characteristics/metrics that are tracked or otherwise of interest. For example, an $N^{th}$ index set may correspond to the number of visits by the user to the content provider's website.

Receiving index data may include receiving index data 406 from a client or other source of the index data, such as database 116. In some embodiments, index data 406 may be transmitted from client 104 to index processing module 402. For example, index data 406 may be embedded within request 130. In some embodiments, index data 406 may be transmitted from an entity other than the client. For example, index data 406 may be retrieved from database 116 of web analytics provider 106 or content providers 102a and 102b. In some embodiments, index data 406 may be received in conjunction with activity data 404. For example, client 104 may forward embedded index data 406 within request 130, along with activity data 404. In some embodiments, index data is provided via a cookie. For example, cookie 412, including index data 406, may be provided to index processing module 402 from client 104. Index processing module 402 may parse cookie 412 to extract index data 406 and index datasets 410 relevant to the determination of an index value of interest.

In some embodiments, which of the index sets to provide may be determined base on the content/type of activity data being transmitted. For example, where activity data 404 includes data regarding a user visit to a website, but does not include data relating to a purchase transaction, at least index sets 406 corresponding to user visits (e.g., visit number index set 406n) may be provided to index processing module 402, whereas index sets 406 corresponding to purchases (e.g., purchase number index set 406a and purchase amount index set 406b) may not be provided to index processing module 402. Where, for example, activity data 404 includes data regarding a purchase transaction via the website, at least index sets 406 corresponding to purchases (e.g., purchase number index set 406a and purchase amount index set 406b) may be provided to index processing module 402 while other index sets may not be provided.

In some embodiments, index data may be provided separately from activity data. For example, index data 406 may be retrieved in response to receiving activity data 404. In some embodiments, processing module 402 may submit a query for index data 406 in response to receiving activity data 404. For example, in response to receiving activity data 404, index processing module may query browser application 104 and/or database 116 for index data 406 stored in cookie 412 and/or database 116. In some embodiments, the particular index data 406 requested may be based on the activity data received. For example, index processing module 402 may determine that activity data 404 includes data regarding a user visit to a website, but does not include data relating to a purchase transaction, and may submit a query to client 104 and/or database 116 for at least index sets 406 corresponding to user visits (e.g., visit number index set 406n) and may not request index sets 406 corresponding to purchases (e.g., purchase number index set 406a and purchase amount index set 406b). Where, for example, index processing module 402 determines that activity data 404 includes data regarding a purchases transaction via the website, index processing module 402 may submit a query to client 104 and/or database 116 for at least index sets 406 corresponding to purchases (e.g., purchase number index set 406a and purchase amount index set 406b) and may not request other index sets 406.

In some embodiments, index data may be provided/received independent of activity data. For example, index data 406 may be provided to index processing module 402 regardless of whether or not activity data 404 has been received. In some embodiments for example, index processing module 402 may receive query for an updated index value and, in response to receiving the query for the updated index value, index processing module may query client 104 and/or database 116 for the corresponding index data. Where there is no additional relevant activity data (e.g., there have been no purchases since the calculation of the index data), index processing module 402 may generate updated index data based on the index value and corresponding time stamp. For example, an updated purchase number index, accounting for exponential decay, may be determined based on index value 412a and timestamp 414a, as described herein.

Figure 7:
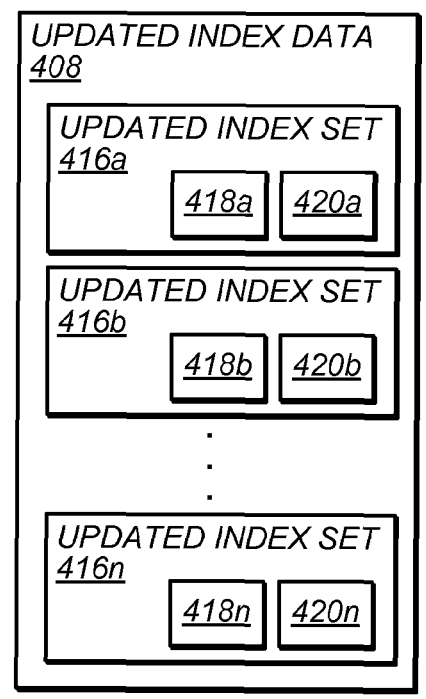
FIG. 7 is a block diagram that illustrates an exemplary representation of updated index data in accordance with one or more embodiments of the present technique.

Method 500 may include applying a decay function to the data to generate updated index data, as depicted at block 506. In some embodiments, applying a decay function may include applying a half-life exponential decay to one or more index values to generate an updated an updated index set, including an updated index value and a corresponding timestamp. Applying a half-life exponential decay may include applying the relationship of equation (1) to one or index values, as described with respect to dataset 202 of FIG. 2 and charts 300, 302 and 304 of FIGS. 6A-6C. For example, with regard to above described example, to reflect the index data generated in response to the purchase at day thirty-two, the purchase number index and the purchase amount index may be updated such that a value of one is stored for index value 412a, a value of thirty-two is stored for timestamp 414a, a value of one-hundred is stored for index value 412b, a value of thirty-two is stored for timestamp 414b. Upon the subsequent receipt of activity data 404 corresponding to the purchase on day sixty-four, index processing module 402 may increment the values and apply half-life exponential decay to generate corresponding updated index data 408. FIG. 7 is a block diagram that illustrates an exemplary representation of updated index data 408 in accordance with one or more embodiments of the present technique. In the illustrated embodiment, updated index data 408 includes a plurality of updated index sets 416a-416n (collectively referred to as index sets 416) that each defines respective index values 418a-418n (collectively referred to as index values 418) and respective timestamps 420a-420n (collectively referred to as timestamps 420) corresponding to times of the determination of the updated index value of the index sets. As described above with respect to dataset 202 of FIG. 2 and charts 300 and 302 of FIGS. 3A-3B, the purchase number index is increased by one to about 1.8 and the monetary amount index increased by twenty, to a value of about one-hundred. Updated index data 408 may reflect the updated value for the purchase number index and the purchase amount index. For example, to reflect the updated index data generated in response to the purchase at day sixty-four, a value of about 1.8 is stored for updated index value 418a, a value of sixty-four is stored for updated timestamp 420a, a value of about one-hundred is stored for updated index value 418b, and a value of sixty-four is stored for updated timestamp 420b.

Method 500 may include outputting updated index data, as depicted at block 508. Outputting updated data may include storing updated index data in place of or in addition the previously stored index data. For example, updated index data 408 may replace corresponding portions of index data 406 of cookie 412 and/or database 116. In some embodiments, the updated index data may be provided to some other location. For example, updated index data 408 may be transmitted to a content provider for review.

In some embodiments, updated index data 408 may include all or substantially all of the index data 406, such that all or substantially all of index data 406 is replaced by updated index data 408. For example, all datasets 410a-410n may be replaced by updated index sets 416a-416n. In some embodiments, updated index data 408 may include only some of index data 406 such that the entirety of index data 406 is replaced by updated index data 408. For example, where only datasets pertaining to purchases are updated (e.g., updated index set 416a for the purchase number index and 416b for the purchase amount index), only corresponding portions of index data may be replaced (e.g., index sets 410a and 410b replaced by updated index sets 416a and 416b, respectively).

Figure 8:
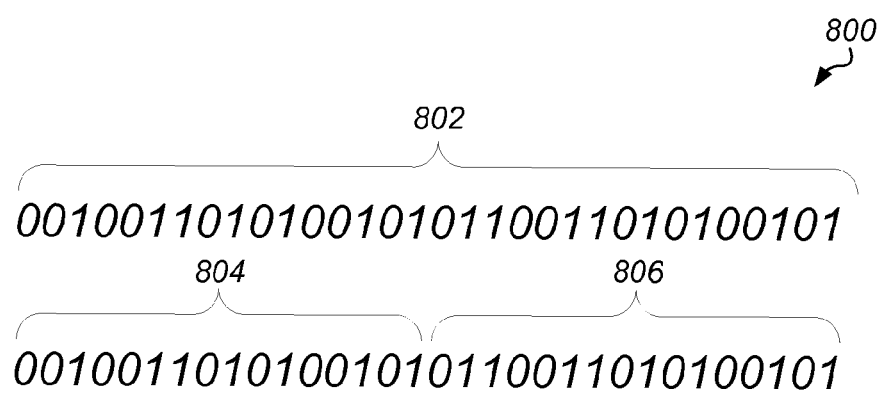
FIG. 8 is a diagram that illustrates an exemplary components of index data in accordance with one or more embodiments of the present technique.

In some embodiments, each index set comprises two numbers. For example, a first number may include the index value (or at least a representation thereof) and the second number may include the corresponding timestamp (or at least a representation thereof). In some embodiments, an additional number may be added to include an identifier. FIG. 8 is a diagram that illustrates an exemplary set of index data 800 in accordance with one or more embodiments of the present technique. Index data 800 includes a eight-bytes (e.g., sixty-four bits) of binary data that are used to represent the corresponding index data. A first portion 802 includes four-bytes (thirty-two bits) reserved for an identifier, a second portion 804 includes two-bytes (sixteen bits) reserved for the index value and a third portion 806 includes two-bytes (sixteen bits) reserved for the time stamp. The thirty-two bits may be used to represent over four billion unique values for the identifier. Each of the sixteen bits may be used to represent 65,536 values (e.g., $2^{16}$ values). Accordingly, for an index measured in tenths, and thus having a single decimal place, first portion 802 may be used to represent index values in the range of 0.0 to 6,553.6. Further, for a timestamp measured in days, second portion 804 may be used to represent index values in the range of 0-65,536 days. Thus, where the index value is a metric value, or is at least used to generate a metric value, for a given dataset, each metric for the dataset may be represented by eight-bytes of data. In some embodiments, multiple index sets may be stored in a location to represent multiple metrics. For example, a single 4 kilobyte (kB) cookie (e.g., cookie 412) could store approximately five-hundred different index sets. Thus, a single 4 kB cookie could store data for approximately five hundred unique metrics. The arrangement and size of the datasets and/or storage location (e.g., cookie) may be varied. For example, each portion of index data 800 may be reduced by half such that approximately a single 4 kB cookie could store data for approximately one-thousand unique metrics.

In some embodiments, subsequent index data updates may be based on the updated index data 408 now stored in place of the previous index data such that the index data is iteratively updated. For example, a second update of the index data may be based on at least the updated index sets 416a and 416b to generate a second set of updated index data, and so forth.

It will be appreciated that method 500 is an exemplary embodiment of a method employed in accordance with techniques described herein. Method 500 may be may be modified to facilitate variations of its implementations and uses. Method 500 may be implemented in software, hardware, or a combination thereof. The order of method 500 may be changed, and various elements may be added, reordered, combined, omitted, modified, etc.

Figure 9:
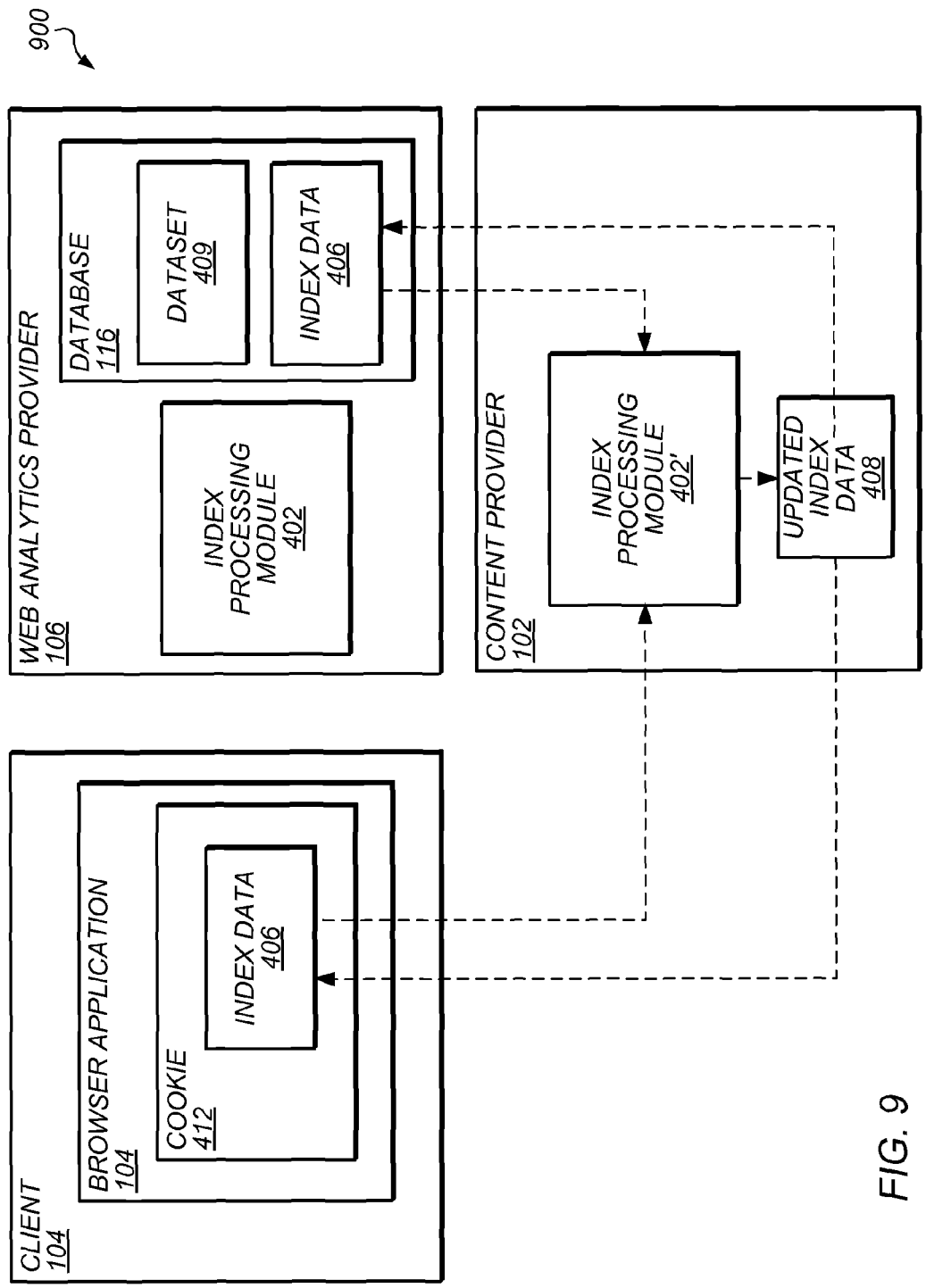
FIG. 9 is a block diagram that illustrates an exemplary indexing system in accordance with one or more embodiments of the present technique.

Although some embodiments have been descried with respect to a web analytics provider, other embodiments may be employed by one or more other entities, such as a content provider. FIG. 9 is a block diagram that illustrates an indexing system 900 in accordance with one or more embodiments of the present technique. In the illustrated embodiment, content provider 102 (e.g., content provider 102a or 102b) includes an index processing module 402'. Index processing module may be used to implement the techniques described with respect to method 500 described above. For example, upon receiving a request for content, content provider 102a may retrieve index data 406 from cookie 412 of client 104 or web analytics provider 106, process index data 406 (and/or any corresponding activity data 404) at processing module 402 (e.g., running on server 110a), generate updated index data 408, select and server customized content to client 104 based at least in part on index data 406 and/or updated index data 408, and provide updated index data 408 to client 104 and/or web analytic provider 106 for storage in place of index data 406. In some embodiments, a plurality of entities may include an index processing module for updating index data. For example, as illustrated, web analytics provider 106 and content provider 102 may include index processing modules 402 and 402' for implementing update of index data as describe above. Such an embodiment may enable index data to be regularly updated as various entities receive or otherwise contact the data.

Exemplary Computer System

Figure 10:
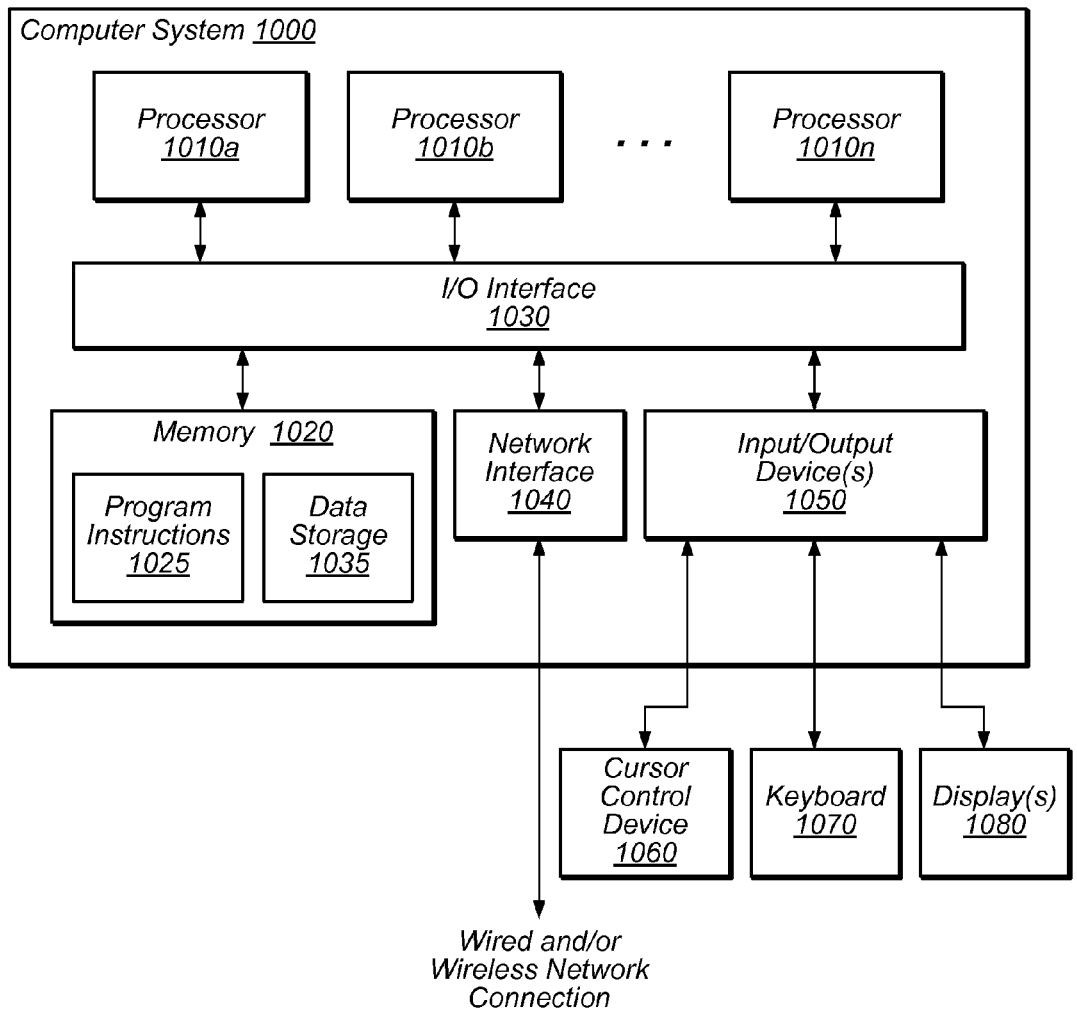
FIG. 10 is a diagram that illustrates an exemplary computer system in accordance with one or more embodiments of the present technique.

Various portions of systems 100, 400 and 900 and method 500, as described herein, may be executed on one or more computer systems, which may interact with various other devices. For example, content providers 102a/102b, client 104, web analytics provider 106, web content servers 110a/110b, browser application 112, web analytics server 114, web analytics database 116, web analytics processing module 118, and/or index processing module may each include, employ or be executed on one or more computer systems. FIG. 10 is a diagram that illustrates an exemplary computer system 1000 in accordance with one or more embodiments of the present technique. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040. Program instructions may include instructions for implementing the techniques described with respect to method 500.

In some embodiments, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 108), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of a layout-preserved text generation method as described herein, and data storage 1035, comprising various data accessible by program instructions 1025. In one embodiment, program instructions 1025 may include software elements of a layout-preserved text generation method illustrated in the above Figures. Data storage 1035 may include data that may be used in embodiments, for example input PDF documents or output layout-preserved text documents. In other embodiments, other or different software elements and/or data may be included.

Those skilled in the art will appreciate that computer system 1000 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A method for updating index data, the method comprising:

receiving index data comprising:

an index value indicative of user activity on a network site; and an index time corresponding to a time when the index value was calculated;

receiving an update index time corresponding to a time when the index data was updated;

determining an updated index value using a half-life exponential decay of the index value from the index time to the update index time, wherein the updated index value comprises a decayed value of the index value corresponding to the update index time; and storing updated index data comprising:

the updated index value; and the update index time.

2. The method of claim 1, wherein the half-life exponential decay of the index value from the index time to the update index time is determined in accordance with the following function:

$$I(t) = I_o \left(\frac{1}{2}\right)^{\frac{(t-t_o)}{t_{1/2}}}$$

wherein I(t) is the index value at the update index time t, $I_o$ is the index value at the index time $t_o$, and $t_{1/2}$ is a specified half-life.

3. The method of claim 1, wherein storing updated index data comprises:
storing the updated index value in place of the index value; and
storing the update index time in place of the index time.

4. The method of claim 3, further comprising:
receiving a second update index time corresponding to a second time when the index data was updated;
determining a second updated index value by calculating an exponential decay of the updated index from the update index time to the second update index time, wherein the second updated index value comprises a decayed value corresponding to the second update index time; and
storing second updated index data by:
storing the second updated index value in place of the updated index value; and
storing the second updated index time in place of the update index time, such that updated index values of a current iteration of updating index data are determined based on index data stored during a preceding iteration of updating index data.

5. The method of claim 1, wherein the index data is retrieved from a cookie of a client and the updated index data is stored in the cookie of a client.

6. The method of claim 1, wherein the index data is retrieved from a web-analytics database and the updated index data is stored in the web-analytics database.

7. The method of claim 1, further comprising:
receiving activity data corresponding to an activity time that is between the index value time and the update index time, wherein the updated index value comprises an aggregated decay value of the index value and the activity data at the update index time.

8. The method of claim 1, wherein the updated index value is determined in response to receiving a request to determine an updated index value.

9. The method of claim 1, wherein the updated index value is determined in response to receiving activity data corresponding to user activity with the network site, wherein said determining the updated index value comprises adding a value representing the received activity data to the decayed value.

10. The method of claim 1, wherein the index value corresponds to a web analytics metric.

11. The method of claim 1, wherein the index value corresponds to a web analytics metric indicating one or more of: items purchased, number of purchases, amount of purchases, browsing activity, number of content views, and user demographics.

12. A non-transitory computer readable storage medium having instructions stored thereon that, when executed by a computing device, cause the computing device to perform operations comprising:
receiving index data, comprising:
an index value indicative of a plurality of prior user activity with a network site; and
an index time corresponding to a time when the index value was calculated;
receiving an update index time corresponding to a time when the index data was updated;
determining an updated index value using a half-life exponential decay of the index value from the index time to the update index time, wherein the updated index value comprises a decayed value of the index value corresponding to the update index time; and
storing updated index data, comprising:
the updated index value; and
the update index time.

13. The non-transitory computer readable storage medium of claim 12, wherein determining the half-life exponential decay of the index value from the index time to the update index time is based on the following function:

$$I(t) = I_o \left(\frac{1}{2}\right)^{\frac{(t-t_o)}{t_{1/2}}}$$

wherein I(t) is the index value at the update index time t, $I_o$ is the index value at the index time $t_o$ and $t_{1/2}$ is a specified half-life.

14. A system, comprising:
a processor; and
a memory coupled with the processor and having instructions stored thereon which, when executed by the processor, cause the processor to perform operations comprising:
receiving index data, comprising:
an index value indicative of a plurality of prior user interactions with a network site; and
an index time corresponding to a time when the index value was calculated;
receiving an update index time corresponding to a time when the index data was updated;
determining an updated index value using a half-life exponential decay of the index value from the index time to the update index time, wherein the updated index value comprises a decayed value of the index value corresponding to the update index time; and
providing updated index data comprising:
the updated index value; and
the update index time.

15. The system of claim 14, wherein the half-life exponential decay of the index value from the index time to the update index time is determined in accordance with the following function:

$$I(t) = I_o \left(\frac{1}{2}\right)^{\frac{(t-t_o)}{t_{1/2}}}$$

wherein I(t) is the index value at the update index time t, $I_o$ is the index value at the index time $t_o$, and $t_{1/2}$ is a specified half-life.

16. The system of claim 14, wherein providing updated index data comprises:
storing the updated index value in place of the index value; and
storing the update index time in place of the index time.

17. The system of claim 14, wherein providing the updated index data comprises providing the updated index data to a client for storage in a cookie.

18. The system of claim 14, wherein providing the updated index data comprises providing the updated index data to a web-analytics provider for storage in a web-analytics database.

\* \* \* \* \*